United States Patent
Randolph et al.

(10) Patent No.: US 6,581,880 B2
(45) Date of Patent: Jun. 24, 2003

(54) ENERGY MANAGED ELECTRIC PROPULSION METHODS AND SYSTEMS FOR STATIONKEEPING SATELLITES

(75) Inventors: Thomas Randolph, San Carlos, CA (US); David Oh, Cupertino, CA (US); Fischer Guenter, Livermore, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/977,834

(22) Filed: Oct. 15, 2001

(65) Prior Publication Data

US 2003/0075645 A1 Apr. 24, 2003

(51) Int. Cl.[7] ................................. F03H 5/00
(52) U.S. Cl. ....................... 244/169; 244/172
(58) Field of Search .............. 244/3.21, 3.22, 244/164, 169, 904, 172

(56) References Cited

U.S. PATENT DOCUMENTS

| | | | | |
|---|---|---|---|---|
| 4,825,646 A | * | 5/1989 | Challoner et al. ........... 60/202 |
| 5,267,167 A | * | 11/1993 | Glickman .................. 162/206 |
| 5,312,073 A | * | 5/1994 | Flament et al. ............. 136/292 |
| 5,595,360 A | * | 1/1997 | Spitzer .................... 244/158 R |
| 5,610,820 A | * | 3/1997 | Shankar et al. ............. 244/164 |
| 5,716,029 A | * | 2/1998 | Spitzer et al. ........... 244/158 R |
| 5,806,804 A | * | 9/1998 | Goodzeit et al. ........... 244/169 |
| 5,810,295 A | * | 9/1998 | Anzel .................... 244/158 R |
| 5,850,992 A | * | 12/1998 | Flament et al. ............. 244/168 |
| 5,947,421 A | * | 9/1999 | Beattie et al. .............. 244/172 |
| 6,027,076 A | * | 2/2000 | Krause ................... 244/158 R |
| 6,032,904 A | * | 3/2000 | Hosick et al. .............. 244/169 |
| 6,036,143 A | * | 3/2000 | Biber ....................... 244/169 |
| 6,089,508 A | * | 7/2000 | Noyola et al. .............. 244/164 |
| 6,121,569 A | * | 9/2000 | Miley et al. ........... 219/121.48 |
| 6,186,446 B1 | * | 2/2001 | Tilley et al. ............ 244/158 R |
| 6,260,805 B1 | * | 7/2001 | Yocum et al. .............. 244/164 |
| 6,341,749 B1 | * | 1/2002 | Ocampo ................. 244/158 R |

* cited by examiner

Primary Examiner—Charles T. Jordan
Assistant Examiner—Stephen A. Holzen
(74) Attorney, Agent, or Firm—Perman & Green, LLP

(57) ABSTRACT

An electric propulsion (EP) device is used to enable, a stationkeeping satellite to track a prescribed stationkeeping Earth orbit. EP propellant and electric power are throttled to vary the thrust and specific impulse of the EP device. A solar array provides electrical power during each Earth day cycle with excess power above that needed by the spacecraft stored by a battery. Software control manages the voltage, current and burn time to minimize propellant usage and impact to the system.

12 Claims, 2 Drawing Sheets

ENERGY MANAGED ELECTRIC PROPULSION METHODS AND SYSTEMS FOR STATIONKEEPING SATELLITES

BACKGROUND OF THE INVENTION

1. Field of the Invention

The present disclosure is directed to new and improved methods and systems for managing the orbits of satellites and the like that employ electrical propulsion ("EP") systems for stationkeeping.

2. Background of Related Developments

EP systems provide a substantial mass advantage over chemical propulsion systems. EP systems operate by converting electrical energy into momentum, typically by heating or ionizing a gas and accelerating it. The propellant mass efficiency of an electric propulsion device is characterized by its specific impulse ("Isp"). An EP device with a higher Isp requires less propellant mass to provide a given total impulse. However, a device with a higher Isp also requires more energy to provide a given total impulse. This means that the device will require more power and/or more time to complete a given mission.

Because of the need to balance propellant mass and power capability, there is an optimum Isp (and therefore optimum power level) for every electric propulsion mission. In general, the optimum Isp depends on the amount of power available for use by the EP device. The more power that is available to the EP device the higher the optimum specific impulse.

SUMMARY OF THE INVENTION

New and improved methods and systems are disclosed for managing an EP system of a satellite requiring stationkeeping. The methods and systems maintain a prescribed Earth orbit employing the following referenced steps and device elements to be considered in combination with one another.

(a) Orbit analysis is used for calculating the burn time of an EP device and the storage battery recharge time required for tracking a predetermined stationkeeping orbit. (b) Power analysis is used for calculating solar eclipse power draw and battery recharge power input.

EP device thruster voltage, current and maximum allowed thruster battery power draw are [c] set and the EP device is (d) ignited to start an EP device burn simultaneously with starting a satellite clock. The (e) satellite clock time is compared to the EP device burn time and the EP device burn is (f) ended if clock time is greater than burn time.

(g) Determining that power draw is greater than or lesser than maximum power draw when clock time is less than burn time. When (h) power draw is greater than maximum power draw, EP thruster current is increased and thruster voltage is decreased. When power draw is less than maximum power draw, (i) decrease thruster current and increase thruster voltage and repeat steps or elements (e) through (i) until step or device (f) when clock time is greater than burn time.

DETAILED DESCRIPTION OF THE PREFERRED EMBODIMENT(S)

Figure 1:
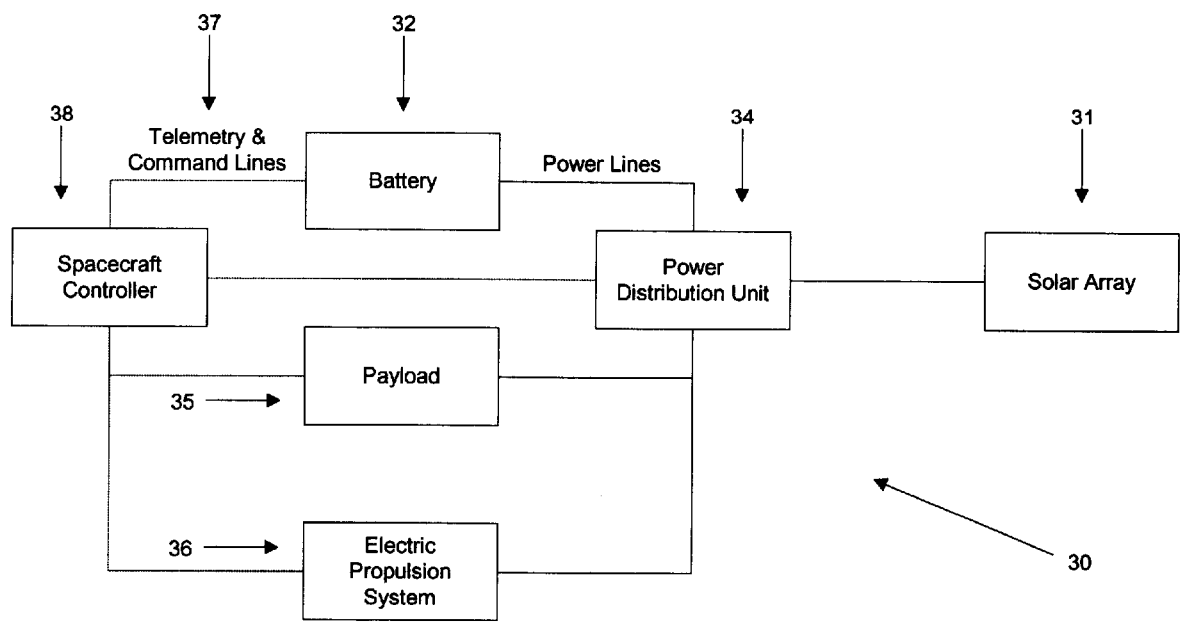
FIG. 1 is a block diagram of major components of the present new and improved Earth orbiting satellite employing an EP system for stationkeeping.

For many years, EP devices have been used for stationkeeping of geostationary communications satellites. The power used for electric propulsion is typically "excess" solar array power left after the needs of the spacecraft bus and payload have been met. The power available varies based on a variety of factors, including with the age of the solar array, the season of the year, the temperature of the spacecraft, and the fraction of the payload that is "in service". Additional power is provided by batteries that are in turn charged using excess power from the solar array. Previous designs have been optimized to operate at the "worst case" condition when minimum power is available from the array (typically at end of life during the Northern Hemisphere Summer). These devices operate at a constant power level throughout the life of the spacecraft.

In the case of geostationary satellites, for most of the satellite's lifetime, the solar arrays are producing significantly more power than in the "worst case" condition. An array that generates 15kW under "worst case" conditions could generate 17kW at a different point in the satellite's lifetime. When excess power is available, the integration of excess power, (i.e. the power available from the satellite solar array beyond that required for the payload, bus and battery recharge) over a given day is effectively "free" energy. When this free energy exists in a given day, it can be stored in a battery or similar energy storage system. This stored energy can then be used to increase the power of the EP system by increasing the specific impulse of the thruster. As a result, the satellite's total propellant load for stationkeeping can be reduced without increasing the cost or mass of the power system.

This novel EP system first requires an electric thruster and a power processing unit capable of operating at different thrusts and specific impulse modes. For ion and Hall type thrusters, this would require operation at different beam or discharge currents and different accelerating or discharge voltages. At constant power, increasing the voltage will increase specific impulse at the expense of thrust and increasing the current will increase thrust at the expense of specific impulse.

This system could have continuously throttleable or discrete current and voltage set points. At the satellite level, this feature could be used to increase voltage, and thus specific impulse, in a combination of the two following methods: maintaining constant power and lengthening the burn or by maintaining constant burn duration and increasing the power level. The first method will keep the battery draw constant but reduce the available recharge time while the second method will keep the available recharge time constant but increase the battery draw. In either case, excess energy available to the satellite during a given day is used to reduce propellant consumption.

In the case of the Deep Space 1 mission the satellite monitors the available power and increases EP system thrust until a battery power drain is observed. The EP system then throttles back in power until the battery drain is no longer observed. Our systems and methods differ from the Deep Space 1 system in two primary ways. First, our methods and systems use the excess energy available during a given power cycle, such as a day, while the Deep Space 1 EP system instantaneously throttles up thruster power to use all immediately available power. Second, although specific impulse varies somewhat over the Deep Space 1 throttling range, the system primarily uses extra power to increase thrust while our methods and systems use excess power to increase specific impulse.

With reference to FIG. 1, the main power-producing component of our stationkeeping satellite 30 is one or more solar arrays 31 that generates electrical power from sunlight. The output of the solar arrays is routed to a power distribution unit 34 which uses a battery 32 for energy storage and provides power to payload 35 and EP device 36. The PDU routes electrical power to a changing mix of individual loads, including an EP system load. Under the direction of the spacecraft controller, it can direct excess solar array power to the battery for storage or draw power from the battery for use by the spacecraft.

The battery 32, PDU 34, payload 35 and EP device 36 are coupled to spacecraft computer 38 by dashed lines 37 representing both telemetry and spacecraft signal lines to permit ground station and satellite communication with and control of the EP device, payload, battery and solar arrays.

Figure 2:
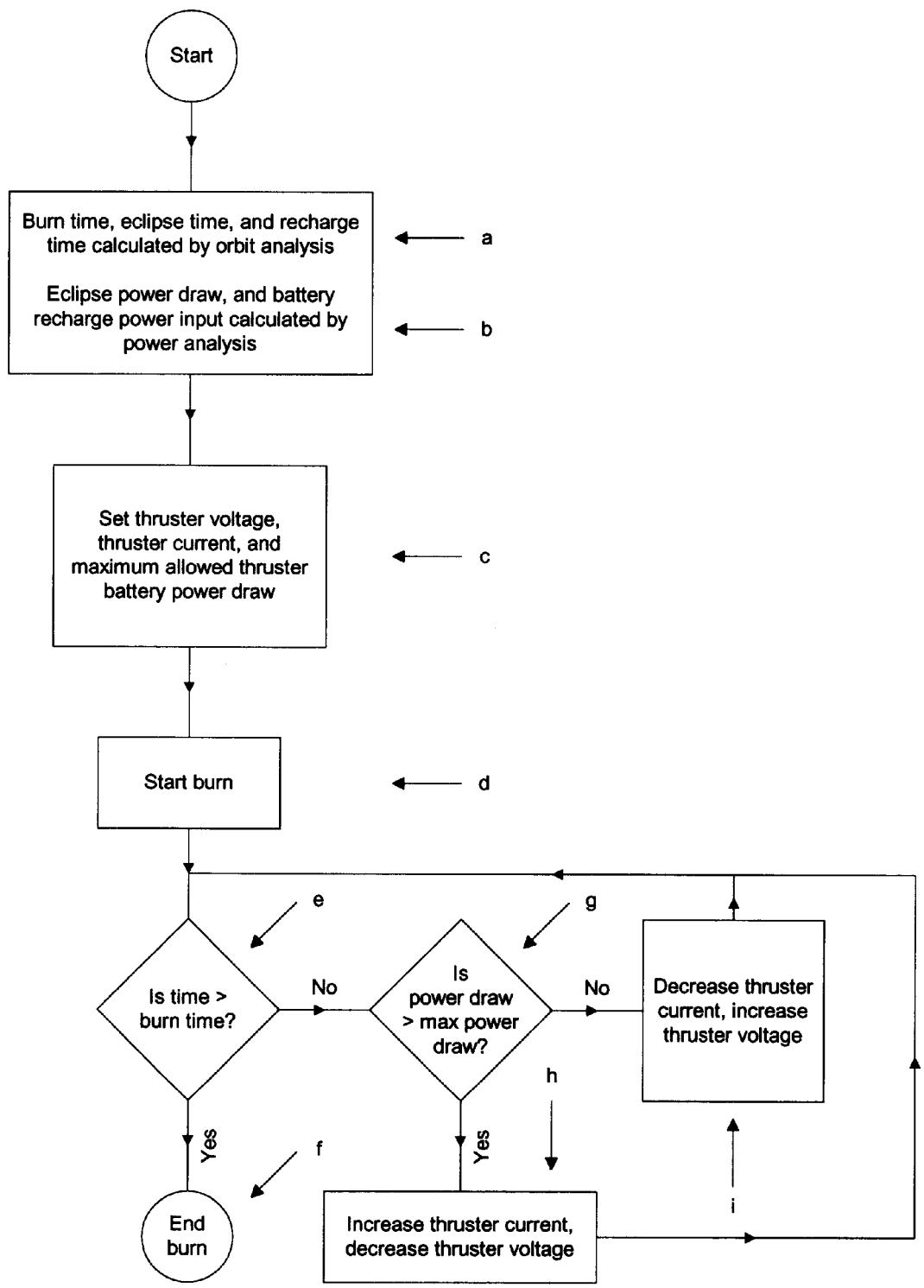
FIG. 2 is a functional block diagram of a software control program installed on the computer aboard the stationkeeping spacecraft for managing the orbital flight of a stationkeeping satellite.

The software flow diagram of FIG. 2 depicts the major method steps and system elements required of the present methods and systems. Specifically, the reference letters (a) through (i) distinctly describe a complete computer control system able to perform the functions required of a station-keeping satellite It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims

What is claimed is:

1. A system for managing an electric propulsion ("EP") device of a satellite to maintain a prescribed stationkeeping Earth orbit, the system comprising at least the following elements to be consider in combination with one another
   an EP device capable of using propellant and electrical power to produce variable thrust and specific impulse that support the mission of the satellite,
   a solar array for producing electrical energy from the sun during each power cycle of the satellite,
   a storage device for storing electrical energy generated by the solar array,
   a controller capable of varying EP device voltage, current, and burn time to utilize stored energy in an optimal manner by minimizing propellant usage and minimizing the impact to the power system.

2. A method for managing an electric propulsion ("EP") device of a satellite to maintain a prescribed stationkeeping Earth orbit, the method comprising:
   using an EP device using propellant and electrical power to produce variable thrust and specific impulse,
   employing a solar array to produce electrical energy from the sun during each power cycle of the satellite,
   storing the electrical energy produced by the solar array in an energy storage device, and
   using a programmed controller to minimize EP voltage draw, current draw and length of EP burn time for minimizing propellant consumption without adversely impacting the mission of the spacecraft.

3. A method for managing an electric propulsion ("EP") device of a geostationary stationkeeping satellite to maintain a prescribed stationkeeping Earth orbit, the method comprising:
   (a) employing orbit analysis for calculating the burn time of an EP device and a storage battery recharge time required for tracking a predetermined stationkeeping orbit,
   (b) employing power analysis for calculating solar eclipse power draw and battery recharge power input,
   (c) setting EP device thruster voltage, current and maximum allowed thruster battery power draw,
   (d) igniting the EP device to start an EP device burn and simultaneously starting a satellite clock,
   (e) comparing satellite clock time to EP burn time,
   (f) ending the EP device burn when clock time is greater than burn time,
   (g) determining that power draw is greater than or lesser than maximum power draw when clock time is less than burn time,
   (h) increasing EP thrust current and decreasing EP thrust voltage when power draw is greater than maximum power draw,
   (i) decreasing EP thrust current and increasing EP thrust voltage when power draw is less than maximum power draw, and
   (j) repeating steps (e) through (i) until step (f) when time is greater than burn time.

4. A system for satellite; station keeping, comprising:
   an electric thruster; and
   a controller for driving the electric thruster at an optimum specific impulse, the controller having circuitry for applying a constant power and varying a burn duration of the electric thruster, and circuitry for maintaining a constant burn duration and varying the power applied to the electric thruster.

5. The system of claim 4, wherein the controller has continuously throttleable current and voltage set points for applying power.

6. The system of claim 4, wherein the controller selects from discrete current and voltage set points for applying power.

7. The system of claim 4, further comprising a battery connected to the electric thruster, wherein the controller has circuitry for maintaining a draw of the battery constant and reducing an available recharge time of the battery, and for maintaining the available recharge time constant and varying the draw of the battery.

8. The system of claim 4, wherein the controller has circuitry for using excess energy available during a satellite power cycle to drive the electric thruster.

9. A method of satellite station keeping, comprising:
   selecting from maintaining a constant battery draw or maintaining a constant recharge time;
   driving an electric thruster by applying a constant power and varying a burn duration of the electric thruster if maintaining a constant battery draw, and
   driving the electric thruster by applying a constant burn duration and varying the power applied to the electric thruster if maintaining a constant recharge time.

10. The method of claim 9, further comprising using continuously throttleable current and voltage set points for applying power.

11. The method of claim 9, further comprising selecting from discrete current and voltage set points for applying power.

12. The method of claim 9, further comprising using excess energy available during a satellite power cycle to drive the electric thruster.

* * * * *